July 3, 1962 T. R. PAUL 3,042,569
METHOD OF MAKING AN UNWOVEN FIBROUS TAPE
Filed Nov. 19, 1958
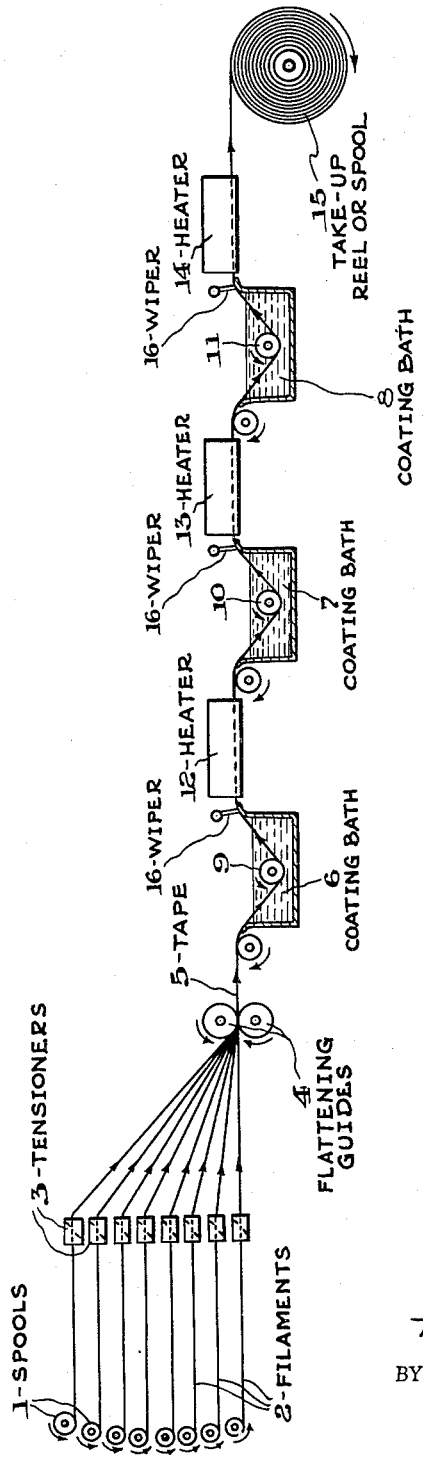
INVENTOR.
THEODORE R. PAUL
BY Archworth Martin
his ATTORNEY 3,042,569
METHOD OF MAKING AN UNWOVEN
FIBROUS TAPE
Theodore R. Paul, Pittsburgh, Pa.
Filed Nov. 19, 1958, Ser. No. 774,984
4 Claims. (Cl. 156—166)

This invention relates more particularly to the forming of a non-woven tape or ribbon from filaments of fiber glass, or strands of other material. The invention is particularly useful in the forming of tapes from glass fibers used for binding or banding armatures of electrical rotors as disclosed in my application Ser. No. 705,254, filed December 26, 1957, now Patent No. 2,949,555 issued August 16, 1960.

While resin-impregnated roves of fiber glass have heretofore been employed to retain electrical coils or windings in place on rotors, such roves have been of generally rope-like form, with the fibers in more or less loose and heterogeneous relation, in that many of the fibers are in crossed relation to other fibers in the rove. Glass fibers are abrasive and when fibers cross each other their ends tend to abrade or cut through themselves, thus giving short life to the binding rove. Again, the roving does not have maximum tensile strength, because only part of the fibers are subjected to tensile strains at a given time, so that failure will gradually occur under the stresses to which the strands of the roving are subjected.

My invention involves broadly the provision of tape-formed glass fiber strands or the like, wherein unitarily-united strands are parallel to one another and therefore all subjected to pulling or tensile stresses in somewhat equal amount.

A further object of my invention is to provide a method whereby yarns or roves each composed of continuous parallel fibers are arranged in tape-like form and can more effectively be impregnated or coated with a thermosetting resin than is the case with fibrous roves heretofore coated or impregnated with resins, whereby they may be hardened into a dense homogeneous mass.

Another object of my invention is to provide an improved means of assembling roves into tape-like form and binding them in unitary relation, by a thermosetting resin which will not only maintain them in unitary relation but when hardened or cured with a number of tape layers in laminated arrangement will form such layers into a dense homogeneous mass.

In the practice of my invention, I draw continuous strands or roves from a series of spools, under equal tension, and place them in side-by-side relation, after which they are passed through a coating bath of thermosetting resin that may or may not contain a solvent as hereinafter explained, and which will unite them in tape-like form; thence past a heating or drying element to evaporate the solvent, and then through another resinous bath or baths between which heating elements are positioned, to evaporate at least the major portion of the solvent, when a solvent is used.

After passing through the last bath, which may be the 3rd or 4th, additional heat is applied to evaporate enough of the solvent to render the tape tack-free. It then may be put into use immediately or stored for future use.

A tape thus impregnated when baked at perhaps 135° C. will become a homogeneous hard mass when wound in layers upon a rotor as mentioned in my said application.

By way of example, a tape may comprise approximately 80 roves or some hundreds or thousands of roves, preferably in a single layer or common plane, and each rove suitably being from .005″ to .030″ in thickness, and each containing some hundreds of continuous fibers.

The resinous bath comprises any thermo-setting resin such as: epoxy resins, polyester resins, and silicone resins, all of which are commercially available.

It is desirable to use an amount of solvent such as toluol, alcohol, benzol and acetone in sufficient percentages with these resins to facilitate the wetting out of the glass yarn.

The solvent may suitably be from 5 to 15 times as much as the resin, and the oven temperature from 120° F. to 275° F., depending upon the rate of travel and degree of cure desired.

The solvent, or the major portion thereof will be removed by heat or air, to start polymerization, as hereinafter described.

The tape when completely impregnated, after the final bath and the solvent removed, will contain 27% resin and 73% fibers, by weight.

A suitable system or apparatus for practicing my invention is shown in the accompanying drawing wherein:

The FIGURE is a schematic illustrative view of the various steps.

The system shown on the drawing comprises storage spools 1 from which roves 2 are drawn past tensioners 3 which impart a change of direction to said roves, effecting such tension as the roves move slidingly past the tensioners. Even for ribbon-like tapes, there may be as many as 80 roves. The roves, and desirably the fibers, are all continuous, and as each spool 1 becomes emptied, the rear end of its roving will be connected to the front end of a roving on another spool. These glued connections will naturally be staggered in directions longitudinally of the fibers. The tensioners 3 insure that the roves will be all under stress and will therefore each take some of the load at any given time.

Guide rollers or the like 4 bring the fibers into side-by-side relation and parallelism preliminary to adhesively connecting them in the forming of the tape 5. The tape is drawn through coating tanks at 6, 7 and 8 which contain the resin and solvent as above stated. The various guide rollers, including 9, 10 and 11 can suitably be idlers. At the heaters, 12, 13 and 14, the solvent or most of it, will be vaporized, which vaporization takes place after the tape passes the wiper members 16 that lightly engage the fibers, but leaving a substantial quantity of the resin and solvent thereon, the solvent then being driven off as above explained. The removal of the solvent at 12 and 13 exposes the fibers for additional impregnation by resin in the tanks 7 and 8, thus more effectively coating and uniting the fibers into coalesced unitary relation.

At the final heater 14, sufficient solvent will be removed to render the tape non-tacky, whereupon it can be wound upon a reel at 15 and stored for future use, or can be put into use directly by winding it around a rotor on which it is to be used.

The tape, when placed into use, will be wound under some tension, so that when the layers are subjected to a hardening temperature as above mentioned, the turns or wrappings of the tape will become a dense, hard mass, which will be in the nature of a fiber-reinforced casting.

In some instances it is desirable to use a silicone, polyester or epoxy resin composed of 100% solids with no thinner. The viscosity desired may be obtained by using a corrective material such as styrene which will react with polyesters and form a solid mass and not "gas" at elevated, curing or other temperatures, thereby insuring a homogeneous mass without voids, which results in a stronger casting.

There is an advantage in passing the roves through a plurality of tanks, in that a better impregnation or penetration between the extremely fine fibers, is effected, thus making for homogeneity when cured. This is true, whether a solvent is used or not used, since the light pressure exerted by the wipers is such that surplus resin is lightly scraped from the upper and lower surfaces of the tape as it leaves each bath and also tends to force some of the resin into the body of the tape thereby effecting a so-called sizing operation. The foregoing is achieved by virtue of the spacing of 16 at the one side of the tape as shown in the drawing.

While the drawing shows the tape being wound on a reel for future use, it should be understood that it can be wound on a permanent support such as the armature shown in my said application and heat cured permanently thereon.

I claim as my invention:

1. A method for producing unwoven tape material, comprising the steps of passing a plurality of rovings past guide members having directionally guiding engagement with a respective one of said rovings, gathering said rovings into a tape wherein said rovings are disposed in parallel, side-by-side relation, thereafter passing said gathered parallel rovings through a solution of thermosetting resin coating material, passing the coated fibers between relatively fixed members which are spaced respectively one on each side of said tape and proportioned to provide a distance therebetween effective for scraping excess resin carried thereon from the surface of said tape and also forcing some of said resin into the body of said tape to provide a sizing action, heating the sized resin-impregnated material to effect solvent removal as a principal operation, and thereafter repeating for at least one additional cycle the impregnating-sizing-heating operations to produce a substantially solventless and appropriately proportioned tape material having coalesced resin effective for maintaining said parallel fibers in their gathered positions.

2. The process in accordance with claim 1 including the step of exerting longitudinally imposed tension on each of said filaments to effect a placement thereof in close-fitting side-by-side relation within a common plane while they are adhesively connected by the resin coating.

3. The process in accordance with claim 1 including the steps of wrapping the tape material as it is produced from the final coating-sizing-and-heating operation and wrapping it under tension in a succession of concentric layers, and thereafter heating to effect a polymerization of said resin which is converted from a soft relatively pliable condition to a hard rigid body forming a dense fiber-reinforced casting.

4. A process for producing a tape material having all substantially parallel rovings bonded in parallel position by an adhesive resin material, comprising the steps of feeding a plurality of rovings from individually wound spools which provide substantially continuous lengths of fiber, disposing each individual filament along a given path of longitudinal movement and simultaneously providing sliding guidance thereto, gathering said fibers during their longitudinal movement into the shape of a substantially flat tape configuration wherein each of said fibers is disposed in substantially parallel and side-by-side relation, thereafter directing the parallel gathered rovings through a container having liquid phase resin material suitable for adhesively joining said fibers and retaining them in parallel relation, passing the resin impregnated tape between a pair of members disposed one on each side of said tape and wherein one of said members is spaced from the surface of the tape by an amount which effects light pressure thereagainst which removes excess resin from the impregnated tape and forces a portion thereof within the spaces provided between adjoining tape rovings, heating the proportioned and impregnated tape to effect substantially complete removal of the solvent portion thereof, and thereafter repeating the impregnating and proportioning operations to produce a tape having the desired proportions of thickness and resin-to-roving material whereby the finished tape is suitable for curing into a homogeneous mass characterized by absence of voids and providing a dense hard mass in the nature of a fiber-reinforced casting.

References Cited in the file of this patent

UNITED STATES PATENTS

| | | |
|---|---|---|
| 787,886 | Anet | Apr. 25, 1905 |
| 2,354,702 | Protz | Aug. 1, 1944 |
| 2,492,498 | Pedersen | Dec. 27, 1949 |
| 2,546,230 | Modigliani | Mar. 27, 1951 |
| 2,552,124 | Tallman | May 8, 1951 |
| 2,743,207 | Rusch | Apr. 24, 1956 |
| 2,775,860 | Morrison | Jan. 1, 1957 |
| 2,952,576 | Wheelock et al. | Sept. 13, 1960 |
| 2,956,613 | Edelman et al. | Oct. 18, 1960 |

FOREIGN PATENTS

| | | |
|---|---|---|
| 619,674 | Great Britain | Mar. 14, 1949 |
| 793,247 | Great Britain | Apr. 16, 1958 |